(12) United States Patent
McIntosh

(10) Patent No.: US 10,836,005 B2
(45) Date of Patent: Nov. 17, 2020

(54) LOCATING PIN ASSEMBLY

(71) Applicant: PHD, Inc., Fort Wayne, IN (US)

(72) Inventor: Bruce D. McIntosh, Princeton, IN (US)

(73) Assignee: PHD, Inc., Fort Wayne, IN (US)

(*) Notice: Subject to any disclaimer, the term of this patent is extended or adjusted under 35 U.S.C. 154(b) by 374 days.

(21) Appl. No.: 15/426,667

(22) Filed: Feb. 7, 2017

(65) Prior Publication Data

US 2017/0225282 A1 Aug. 10, 2017

Related U.S. Application Data

(60) Provisional application No. 62/292,561, filed on Feb. 8, 2016.

(51) Int. Cl.
*B25B 5/08* (2006.01)
*B23Q 3/18* (2006.01)
*B25B 5/06* (2006.01)

(52) U.S. Cl.
CPC ............. *B23Q 3/18* (2013.01); *B25B 5/061* (2013.01); *B25B 5/062* (2013.01); *B25B 5/087* (2013.01)

(58) Field of Classification Search
CPC .. B25B 5/061; B25B 5/08; B25B 5/06; B25B 5/087; B25B 5/062; B25B 1/00; B25B 1/14
USPC ........................................ 269/32, 24–27, 228
See application file for complete search history.

(56) References Cited

U.S. PATENT DOCUMENTS

| | | | |
|---|---|---|---|
| 2,005,040 A | 6/1935 | Knowlton | |
| 5,013,015 A * | 5/1991 | Fatheree | B25B 5/062 269/24 |
| 5,474,117 A | 12/1995 | Henkenjohann | |
| 6,435,493 B1 | 8/2002 | Hoover | |
| 6,685,177 B2 | 2/2004 | Dugas et al. | |
| 6,786,478 B2 | 9/2004 | Pavlik et al. | |
| 7,182,326 B2 | 2/2007 | McIntosh et al. | |
| 7,370,856 B2 | 5/2008 | Sawdon et al. | |
| 8,146,900 B2 | 4/2012 | Miyashita et al. | |
| 8,376,336 B2 | 2/2013 | McIntosh | |
| 8,413,970 B2 | 4/2013 | McIntosh | |

(Continued)

OTHER PUBLICATIONS

PLK 04 phd Solutions for Industrial Automation catalog; extracted form www.phdinc.com (Year: 2017).*

(Continued)

*Primary Examiner* — Orlando E Aviles
*Assistant Examiner* — Mahdi N Nejad
(74) *Attorney, Agent, or Firm* — Taylor IP, P.C.

(57) ABSTRACT

A locating pin assembly including a locating pin movable between extended and retracted positions. The locating pin includes a locating pin top having a top end and a bottom end, a locating pin base receiving the bottom end of the locating pin top, and a dowel pin configured to couple the locating pin top and locating pin base together. The locating pin assembly also includes a drive rod moveable relative to the locating pin. The drive rod includes a drive rod top having a top end and a bottom end, and a drive rod base partially housing the drive rod top. The locating pin assembly also includes a finger coupled to the drive rod and movable between extended and fully retracted positions, the finger is extended by the drive rod without movement of the locating pin, and the finger is rotatable from a first position to a second position.

9 Claims, 4 Drawing Sheets

(56) References Cited

U.S. PATENT DOCUMENTS

| | | | |
|---|---|---|---|
| 8,459,626 | B2 | 6/2013 | Sawdon et al. |
| 8,517,360 | B2 | 8/2013 | Kawakami |
| 9,144,888 | B2 | 9/2015 | Corriveau et al. |
| 9,168,621 | B2 | 10/2015 | McIntosh |
| 9,314,905 | B2 | 4/2016 | Zajac, Jr. et al. |
| 9,486,898 | B2 | 11/2016 | Zajac, Jr. |
| 2004/0070130 | A1* | 4/2004 | Pavlik .................. B25B 5/087 269/32 |
| 2005/0006834 | A1* | 1/2005 | Mulder ................. F15B 15/24 269/320 |
| 2005/0035516 | A1 | 2/2005 | Sawdon et al. |
| 2005/0040578 | A1* | 2/2005 | Sawdon ................ B25B 5/062 269/32 |
| 2006/0049565 | A1* | 3/2006 | Petit .................... B25B 5/087 269/32 |
| 2007/0045362 | A1* | 3/2007 | Colby ................... B25B 5/087 224/101 |
| 2008/0229559 | A1* | 9/2008 | Miyashita ......... B23K 37/0435 24/528 |
| 2016/0129558 | A1 | 5/2016 | Schauss et al. |

OTHER PUBLICATIONS

PLK 05 phd Solutions for Industrial Automation catalog; extracted form www.phdinc.com (Year: 2018).*
Extended European Search Report dated Jul. 25, 2017 for European Patent Application No. 17 15 4901 (10 pages).

* cited by examiner

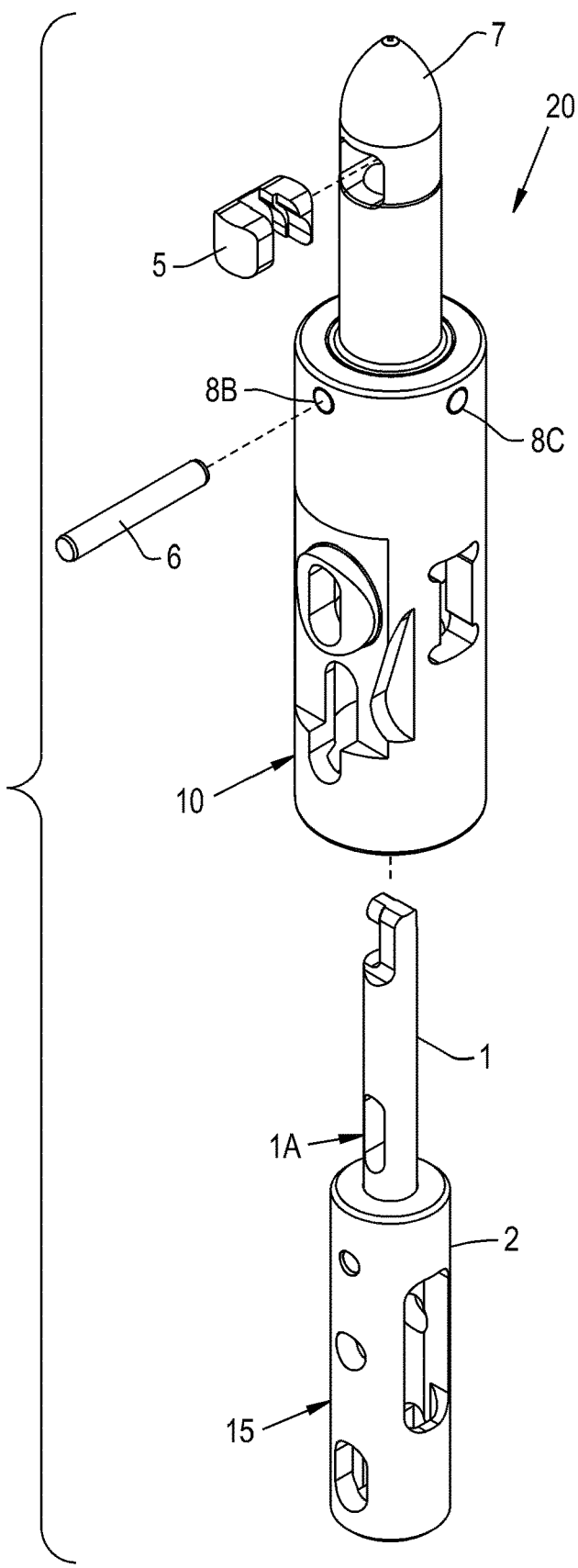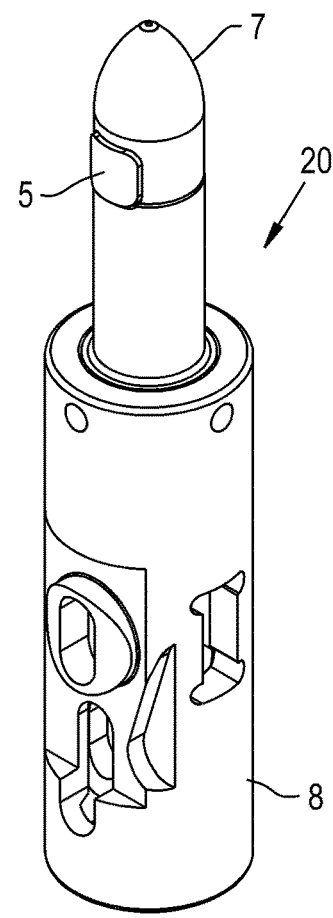
FIG 2
FIG 3

LOCATING PIN ASSEMBLY

CROSS REFERENCE TO RELATED APPLICATIONS

This is a non-provisional application based upon U.S. provisional patent application Ser. No. 62/292,561, entitled "LOCATING PIN ASSEMBLY", filed Feb. 8, 2016, which is incorporated herein by reference.

BACKGROUND OF THE INVENTION

1. Field of the Invention

The present invention relates to pin clamp assemblies, and, more particularly, to a pin clamp assembly having a locating pin, a drive rod, and a finger such that the locating pin and the finger can be rotated or replaced without removal and disassembly of the entire pin clamp assembly.

2. Description of the Related Art

Typically, a pin clamp assembly includes a locating pin extending from a body that is inserted into a hole on a workpiece, such as a sheet metal automotive body panel. Pin clamp assemblies generally employ either a stationary or rectilinearly moving locating pin, and they often employ a combination of linearly and rotationally moving components to hold the workpiece. Generally, pin clamp assemblies are powered by actuators employing pneumatic or hydraulic fluid pressure.

In some pin clamp assemblies, a finger extends from within the locating pin as the locating pin retracts in order to hold the workpiece against the body of the clamp. Pin clamps with moveable locating pins often employ the movement of the locating pin to extend the finger. In other words, movement of the locating pin generally moves the finger as well. It is also known in the art to extend the finger without moving the locating pin, via actuation of a drive rod as disclosed in U.S. Pat. No. 8,413,970 entitled "PIN CLAMP ASSEMBLY". However, the finger is at a fixed direction with respect to the pin clamp assembly. If a different finger direction is desired, the entire pin clamp assembly needs to be removed and either turned or replaced with a different pin clamp assembly to achieve the desired finger direction. The process to adjust or remove a pin clamp assembly is generally cumbersome and costly as it ceases production for a longer duration of time and increases labor cost.

What is needed in the art is a pin clamp assembly that can be more easily and cost-effectively adjusted and/or removed.

SUMMARY OF THE INVENTION

The present invention provides an improved locating pin assembly that comprises a locating pin, a drive rod, and a finger such that the finger is easily rotatable to a first and a second position relative to the base of the locating pin assembly.

The present invention in one form is directed to a locating pin assembly that includes a locating pin movable between extended and retracted positions. The locating pin includes a locating pin top having a top end and a bottom end, a locating pin base receiving the bottom end of the locating pin top, and a dowel pin configured to couple the locating pin top and locating pin base together. The locating pin assembly also includes a drive rod moveable relative to the locating pin. The drive rod includes a drive rod top having a top end and a bottom end and a drive rod base partially housing the drive rod top such that the bottom end of the drive rod top is housed within the drive rod base. The locating pin assembly further includes a finger coupled to the drive rod and movable between extended and fully retracted positions, the finger is extended by the drive rod without movement of the locating pin, and the finger is rotatable from a first position to a second position.

The present invention in another form is directed to a pin clamp assembly that includes a body, an actuator coupled to the body, and a locating pin assembly coupled to the body and movable between extended and retracted positions. The locating pin assembly includes a locating pin, a drive rod actuated by the actuator and movable relative to the locating pin, and a finger coupled to the drive rod and movable between extended and fully retracted positions. The finger is rotatable from a first position to a second position relative to the body. The finger is extended by the drive rod without movement of the locating pin upon actuation by the actuator. The pin clamp assembly also includes a cam movable relative to the locating pin and the drive rod, wherein continued retraction of the drive rod after the finger has extended causes the cam to move out from a slot in the body to allow the locating pin to retract.

The present invention in yet another form is directed to a method of adjusting a pin clamp assembly. The method includes the steps of providing the pin clamp assembly that includes a locating pin assembly that includes a locating pin movable between extended and retracted positions. The locating pin includes a locating pin top having a top end and a bottom end, a locating pin base receiving the bottom end of the locating pin top, and a dowel pin configured to couple the locating pin top and locating pin base together. The locating pin assembly also includes a drive rod moveable relative to the locating pin. The drive rod includes a drive rod top having a top end and a bottom end and a drive rod base partially housing the drive rod top such that the bottom end of the drive rod top is housed within the drive rod base. The locating pin assembly further includes a finger coupled to the drive rod and movable between extended and fully retracted positions. The finger is extended by the drive rod without movement of the locating pin, and the finger is rotatable from a first position to a second position. The method includes the further steps of removing the dowel pin of the locating pin, positioning the finger from the first position to the second position by rotating the finger without moving the locating pin base and the drive rod base, and inserting the dowel pin into the locating pin.

An advantage of the present invention is that modification of the direction in which the finger extends can be easily adjusted without the removal of the entire pin clamp assembly.

Another advantage of the present invention is that the top portion of the drive rod rotates with the locating pin top, which maintains the relationships of the components of the pin clamp assembly therebetween.

Yet another advantage of the present invention is that the locating pin top can be changed at the initial assembly or in the field by removing the dowel pin and installing a different locating pin top and finger, thereby allowing a user to easily change locating pin diameters.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is an isometric partially exploded view of the locating pin assembly according to the present invention, including the locating pin of FIG. 1A, the drive rod of FIG. 1B, and a finger;

FIG. 3 is an isometric view showing the assembled locating pin assembly with the finger in a first position;

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1A:
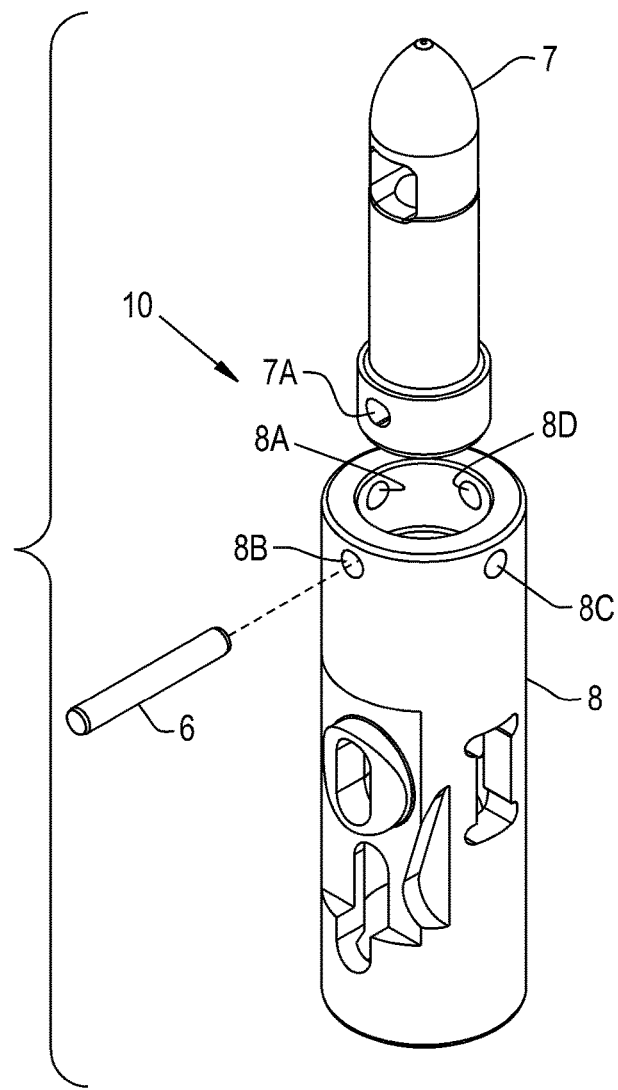
FIG. 1A is an isometric exploded view of the locating pin according to the present invention.
Figure 1B:
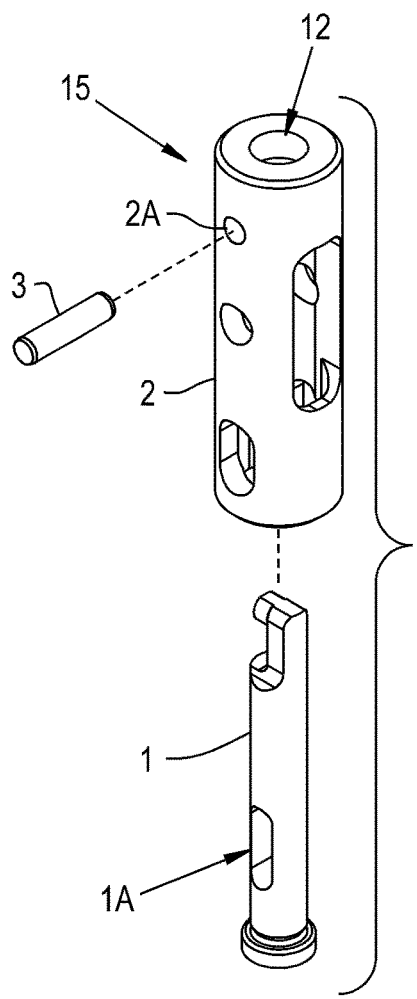
FIG. 1B is an isometric exploded view of the drive rod according to the present invention.

Referring now to FIGS. 1A-1B, there is respectively shown exploded views of the locating pin 10 and the drive rod 15 according to the present invention. The locating pin 10 includes a locating pin base 8, a locating pin top 7, and a dowel pin 6. The drive rod 15 includes a drive rod top 1, a drive rod base 2, and a dowel pin 3.

Referring now to FIG. 2, with continued reference to FIGS. 1A-1B, there is shown a partially exploded view of a locating pin assembly 20 including the locating pin 10, the drive rod 15, and a finger 5. The inventive locating pin assembly 20 may be coupled to a known body and actuator as described in U.S. Pat. No. 8,413,970 entitled "PIN CLAMP ASSEMBLY", which is incorporated herein by reference.

The locating pin top has a proximal end at which at least one hole 7A is located for receiving the dowel pin 6 and a distal end where the finger 5 is positioned. Additionally, instead of just one hole 7A, the locating pin top 7 may have multiple holes positioned around its proximal end (not shown). The locating pin base 8 has a top end thereof with holes 8A, 8B, and 8D, which are associated with the corresponding hole 7A of the locating pin top 7. The dowel pin 6 may be inserted into at least one of the holes 8A, 8B, 8C, and 8D in order to secure the locating pin top 7. The locating pin top 7 and the locating pin base 8 are rotatable relative to each other such that when the dowel pin 6 is removed the locating pin top 7 may be rotated to various positions as the locating pin base 8 remains stationary.

Figure 6:
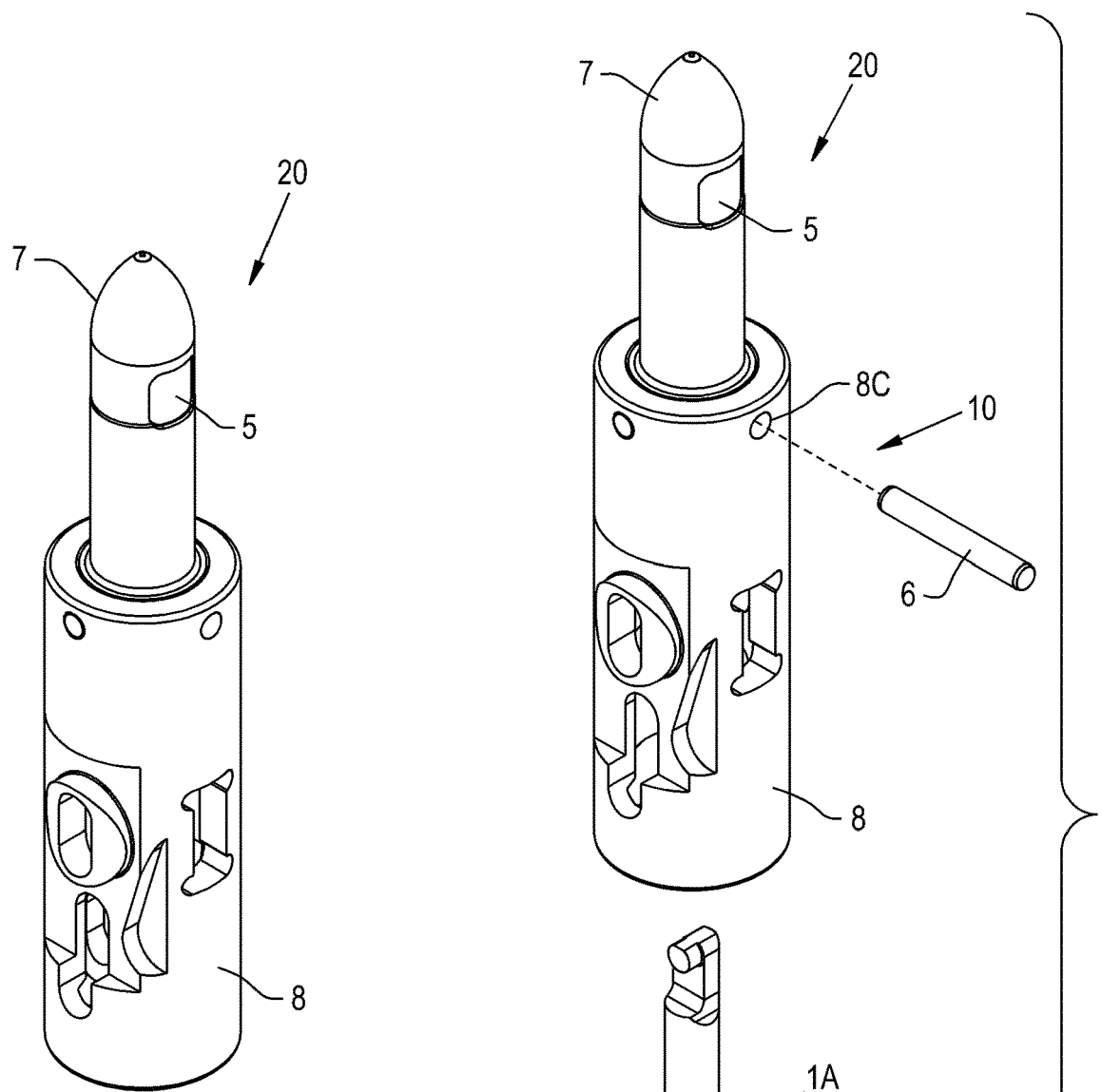
FIG. 6 is an isometric view showing the assembled locating pin assembly with the finger in a second position and the dowel pin installed.
Figure 7:
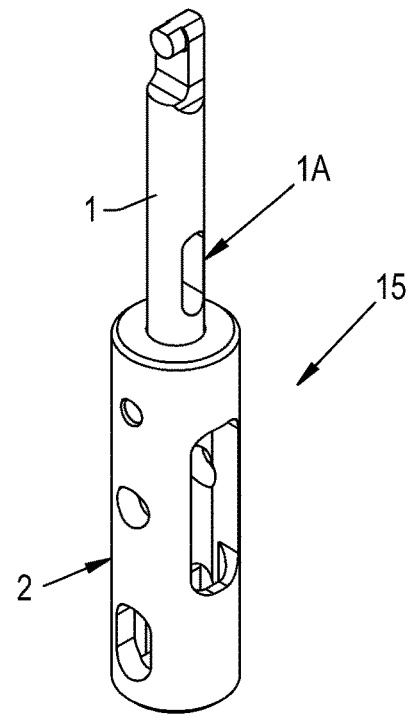
FIG. 7 is an isometric partially exploded view showing the locating pin assembly of FIG. 5 with the drive rod top rotated to match the locating pin top.

The drive rod top 1 has a hole 1A which receives the dowel pin 6 of the locating pin 10. The drive rod base 2 has a bottom end and a top end with a hole 12, as well as a hole 2A for receiving the dowel pin 3. The drive rod 15 is shown assembled as follows: the top end of the drive rod top 1 is inserted into the bottom end of the drive rod base 2 until the distal-most portion of drive rod top 1 is proximal to hole 12, then the dowel pin 3 is inserted into hole 2A. The drive rod base 2 is inserted into and housed within the locating pin base 8 (FIGS. 2 and 6-7). Prior to final assembly of the locating pin assembly 20, the drive rod top 1 is freely able to rotate within but unable to slide downward into the drive rod base 2.

Referring now to FIG. 3, there is shown an assembled locating pin assembly 20 with the finger 5 in a first position relative to the locating pin base 8.

Figure 4:
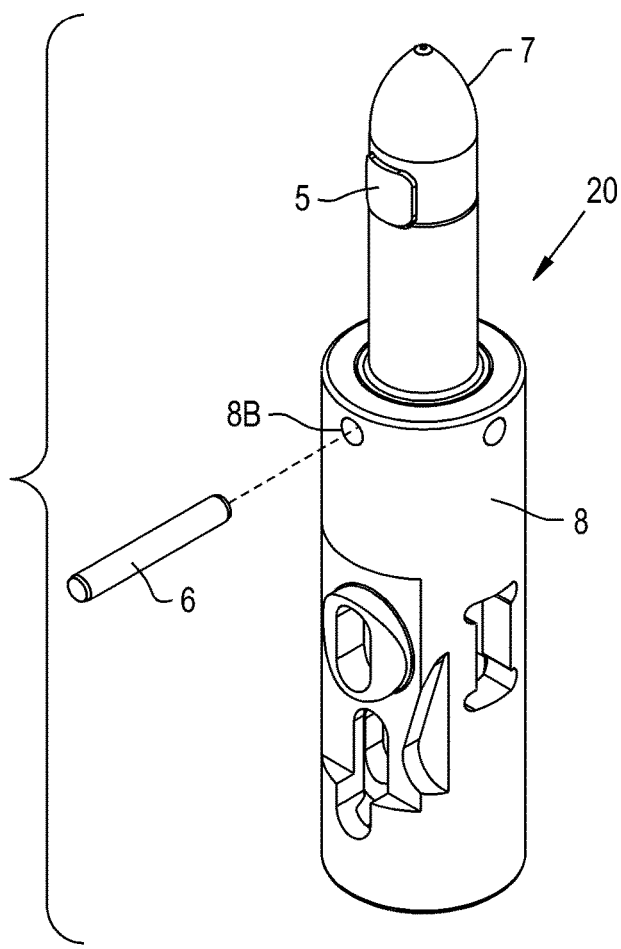
FIG. 4 is an isometric view showing the locating pin assembly of FIG. 3 with a dowel pin removed.
Figure 5:
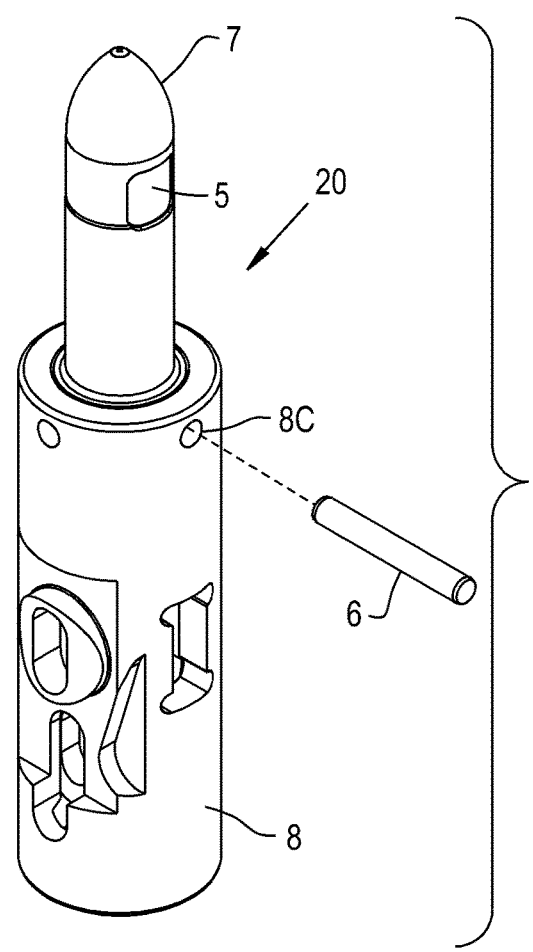
FIG. 5 is an isometric view showing the locating pin assembly of FIG. 3 with the dowel pin removed and the finger rotated to a second position.

Referring now to FIGS. 4-5, there is shown an assembled locating pin assembly 20 with the exception of the dowel pin 6, which is shown to be removed. In FIG. 4, the finger 5 is shown in a first position relative to the locating pin base 8, with the dowel pin 6 to be inserted into hole 8B. By removing dowel pin 6 from hole 8B, the locating pin top 7 and accompanying finger 5 can be rotated to a second position relative to the locating pin base 8. The dowel pin 6 can then be inserted into hole 8C (FIG. 5). The rotational positioning is shown to be in 90 degree increments; however, any increment between 0 and 360 degrees may be used.

Referring now to FIG. 6, there is shown an assembled locating pin assembly 20 with the finger 5 in a second position relative to the locating pin base 8.

Referring now to FIG. 7, there is shown a partially exploded view of a locating pin assembly 20 including the locating pin 10, the drive rod 15, and the finger 5. The locating pin top 7 (and accompanying finger 5 and drive rod top 1) is in a second position which is rotated 90 degrees from the first position relative to the locating pin base 8 of the locating pin assembly 20 as shown in FIG. 2. Yet, the position of the drive rod base 2 remains the same as it was prior to rotation of the locating pin top 7, thereby retaining the ability to extend/retract locating pin top 7 and extend/retract finger 5.

In operation, the position of the finger 5 may be easily adjusted or removed without removal and disassembly of the entire pin clamp assembly 20, which may additionally be coupled to a main body and actuator. To adjust the direction in which the finger 5 extends, after initially removing the part support, the dowel pin 6 is removed from a first hole (e.g., 8B) that corresponds to the first position. Then the finger 5 may be rotated from the first position to the second position. In other words, the locating pin top 7 may be rotated, which thereby rotates the drive rod top 1 and the accompanying finger 5 which is displaced within the locating pin top 7. The finger 5, the locating pin top 7, and the drive rod top 1 are all rotated independently from and without removing or rotating the locating pin base 8 and the drive rod base 2. Alternatively, the locating pin top 7 may be removed and replaced with another locating pin top, for example a locating pin top with a different diameter. Lastly, the dowel pin 6 is inserted into a second hole (e.g., 8C) that corresponds to the second position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A locating pin assembly, comprising:
    a locating pin movable between extended and retracted positions, the locating pin including:

a locating pin top having a top end and a bottom end;

a locating pin base receiving the bottom end of the locating pin top, the locating pin top is rotatable relative to the locating pin base; and a dowel pin configured to couple the locating pin top and the locating pin base together;

a drive rod moveable relative to the locating pin, the drive rod including:

a drive rod top having a top end and a bottom end; and a drive rod base partially housing the drive rod top such that the bottom end of the drive rod top is housed within the drive rod base, the drive rod base being housed within the locating pin base, the drive rod top is rotatable relative to the drive rod base, and the dowel pin is further configured to couple the locating pin top, the locating pin base, and the drive rod top together; and a finger coupled to the drive rod and movable between extended and fully retracted positions, the finger is extended by the drive rod without movement of the locating pin, and the locating pin top, the finger, and the drive rod top are together rotatable from a first position to a second position.

2. The locating pin assembly of claim 1, wherein said finger is rotatable from the first position to the second position relative to and without moving the locating pin base and the drive rod base.

3. The locating pin assembly of claim 1, wherein said locating pin top, said drive rod top, and said finger together are rotationally moveable in at least one 90-degree increment.

4. The locating pin assembly of claim 1, wherein said locating pin base and said locating pin top each have at least one corresponding hole for receiving said dowel pin.

5. The locating pin assembly of claim 1, wherein said drive rod further includes a dowel pin for securing the drive rod top within the drive rod base.

6. The locating pin assembly of claim 5, wherein said drive rod top is rotatable within said drive rod base but is fixed vertically such that said drive rod top cannot move downwardly relative to said drive rod base.

7. The locating pin assembly of claim 1, wherein said finger is positioned within said locating pin top.

8. A pin clamp assembly, comprising:

a body;

an actuator coupled to the body;

a locating pin assembly coupled to the body and movable between extended and retracted positions, the locating pin assembly including:

a locating pin including a locating pin top and a locating pin base;

a drive rod actuated by the actuator and movable relative to the locating pin, the drive rod including a drive rod base and a drive rod top which is at least partially housed within and rotatable relative to the drive rod base, the drive rod base being housed within the locating pin base; and a finger coupled to the drive rod and movable between extended and fully retracted positions, the locating pin top, the finger, and the drive rod top are together rotatable from a first position to a second position relative to the body, the finger is extended by the drive rod without movement of the locating pin upon actuation by the actuator; and a cam movable relative to the locating pin and the drive rod, wherein continued retraction of the drive rod after the finger has extended causes the cam to move out from a slot in the body to allow the locating pin to retract.

9. The pin clamp assembly of claim 8, wherein the locating pin top is rotatable relative to the locating pin base.

* * * * *

UNITED STATES PATENT AND TRADEMARK OFFICE
CERTIFICATE OF CORRECTION

| | | |
|---|---|---|
| PATENT NO. | : 10,836,005 B2 | Page 1 of 1 |
| APPLICATION NO. | : 15/426667 | |
| DATED | : November 17, 2020 | |
| INVENTOR(S) | : McIntosh | |

It is certified that error appears in the above-identified patent and that said Letters Patent is hereby corrected as shown below:

In the Specification

Column 3
At Line 54, please delete "8A, 8B, and 8D,", and substitute therefore --8A, 8B, 8C and 8D,--.

Signed and Sealed this
Eleventh Day of October, 2022

*Katherine Kelly Vidal*

Katherine Kelly Vidal
*Director of the United States Patent and Trademark Office*